US010466109B2

(12) United States Patent
Kawai et al.

(10) Patent No.: US 10,466,109 B2
(45) Date of Patent: Nov. 5, 2019

(54) TEMPERATURE MEASURING DEVICE

(71) Applicant: Mitsubishi Electric Corporation, Tokyo (JP)

(72) Inventors: Masahiro Kawai, Tokyo (JP); Shigeki Tsujii, Tokyo (JP); Hiroshi Sakanoue, Tokyo (JP); Satoi Kobayashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 136 days.

(21) Appl. No.: 15/701,606

(22) Filed: Sep. 12, 2017

(65) Prior Publication Data
US 2018/0266885 A1 Sep. 20, 2018

(30) Foreign Application Priority Data

Mar. 15, 2017 (JP) ................. 2017-049670

(51) Int. Cl.
*G01K 1/00* (2006.01)
*G01K 13/00* (2006.01)
(Continued)

(52) U.S. Cl.
CPC ............ *G01J 5/042* (2013.01); *G01J 5/0014* (2013.01); *G01J 5/048* (2013.01); *G01K 1/12* (2013.01);
(Continued)

(58) Field of Classification Search
USPC ................. 374/208, 143, 148, 120
See application file for complete search history.

(56) References Cited

U.S. PATENT DOCUMENTS

| 2004/0109490 A1* | 6/2004 | Asakura | G01J 5/16 374/133 |
| 2008/0043806 A1* | 2/2008 | Murakami | G01J 5/0003 374/134 |
| 2008/0225925 A1* | 9/2008 | Laverdiere | G01J 5/0037 374/130 |

FOREIGN PATENT DOCUMENTS

| JP | 11-351712 A | 12/1999 |
| JP | 2000-171308 A | 6/2000 |

(Continued)

OTHER PUBLICATIONS

Communication dated Mar. 20, 2018 issued by the Japanese Patent Office in counterpart Japanese application No. 2017-049670.

*Primary Examiner* — Mirellys Jagan
(74) *Attorney, Agent, or Firm* — Sughrue Mion, PLLC; Richard C. Turner

(57) ABSTRACT

This temperature measuring device includes: a case which has a bottomed tubular shape with a closed portion at one end and an opening at the other end, and in which a temperature sensing part is disposed on the side of the closed portion; an infrared temperature sensor unit in which an infrared temperature detection unit that has a light-receiving surface receiving an infrared ray and detects the received infrared ray and outputs the ray in the form of an electrical signal is disposed opposite the temperature sensing part while being spaced therefrom inside the case; and a connection terminal unit which has in the interior thereof a circuit unit that acquires the electrical signal and that generates temperature information so that the temperature information is outputted to an external device, wherein the connection terminal unit can be disposed at a position spaced from the heat source.

7 Claims, 12 Drawing Sheets

(51) Int. Cl.
*G01K 15/00* (2006.01)
*G01J 5/00* (2006.01)
*G01J 5/04* (2006.01)
*G01K 1/12* (2006.01)

(52) U.S. Cl.
CPC .. *G01J 2005/0048* (2013.01); *G01K 2205/04* (2013.01)

(56) References Cited

FOREIGN PATENT DOCUMENTS

| JP | 2009-109266 A | 5/2009 |
|----|---------------|--------|
| JP | 4583354 B2 | 9/2010 |
| JP | 2015-28488 A | 2/2015 |
| JP | 5828033 B2 | 12/2015 |

* cited by examiner

TEMPERATURE MEASURING DEVICE

BACKGROUND OF THE INVENTION

1. Field of the Invention

The present invention relates to a temperature measuring device that utilizes an infrared temperature sensor that measures temperature, for instance, a temperature measuring device used for measurement of exhaust air temperature of an internal combustion engine.

2. Description of the Related Art

So-called exhaust temperature sensors are conventionally known in which the temperature of exhaust gas flowing through an exhaust gas passage such as an exhaust pipe of the interior of a catalytic converter of a purification device in an automobile, is detected by a thermistor element being a temperature sensing element.

In a temperature sensor of this kind, a thermistor element is provided at the tip of a wiring member for extracting signals to the exterior, the tip portion being covered with a metal case having a bottomed tubular shape. The thermistor element is accommodated within the space formed by the metal case and the tip portion of the wiring member.

Further, the interior of an outer tube made of metal is packed with an insulating powder, between the outer tube and core wires, as a result of which the core wires are held insulated from the outer tube. A coupler for electrical connection to the exterior is provided, in a pair of lead wires, at a portion on the end of the lead wires opposite that of a connection portion with the core wires.

In temperature detection by such a temperature sensor, exhaust gas heat from exhaust gas is received by the metal case, and is thereafter transferred from the metal case to the thermistor element (for instance, Japanese Patent Application Publication No. 2000-171308).

As a further temperature detection method, so-called infrared temperature measuring devices are also known in which temperature is detected by an infrared temperature detection unit, being a temperature sensing element, in a state where the detection unit is spaced from a heat source. In a temperature measuring device of this type temperature is detected by detection of infrared light from a temperature sensing part, in the form of the tip section of a tubular member, by an infrared sensor element being a temperature sensing element that is disposed spaced from the temperature sensing part.

In such an infrared temperature measuring device the temperature sensing part is disposed spaced from an infrared temperature detection means, and it is the tubular member that is disposed directly within the high-temperature exhaust gas. Accordingly, it becomes possible to avoid exposure of the infrared temperature detection unit to the high-temperature exhaust gas, and to suppress thermal degradation of the infrared temperature detection unit. Further, the temperature sensing part can be formed having a thin wall. A fast thermal response can be achieved as a result (for instance, Japanese Patent No. 5828033).

As a further temperature detection method, systems are known where, in an internal EGR control device of an internal combustion engine, a target internal EGR amount is corrected in accordance with the temperature of exhaust gas as detected by an exhaust temperature sensor and the pressure of exhaust gas as detected by an exhaust pressure sensor, the sensors being disposed inside an exhaust pipe.

The internal EGR control device controls an intake-exhaust valve timing varying mechanism and a lift mechanism, and controls an internal EGR amount by modification of a degree of valve overlap between an intake valve and an exhaust valve.

Further, the internal EGR control device corrects the targeted internal EGR amount in accordance with the temperature and pressure of the exhaust gas. The internal EGR control device allows controlling more properly the internal EGR amount, by compensating thus control errors derived from changes in temperature and pressure (for instance, Japanese Patent No. 4583354).

SUMMARY OF THE INVENTION

However, conventional technologies have the following problems.

In a temperature measuring device attached to an exhaust pipe, for measuring exhaust gas temperature, an infrared temperature detection unit being a temperature sensing element disposed spaced from a heat source is ordinarily made up of a material having heat resistance at 200° C. or higher. Accordingly, the device can be used in the temperature environment in which the exhaust pipe is attached.

A circuit unit that amplifies signals from the infrared temperature detection unit, however, must be used ordinarily at or below 150° C., on account of constraints such as semiconductor junction temperature. Therefore, measures must be taken, relying on constituent parts surrounding the circuit unit, with a view to reducing the thermal impact from the heat source.

Specific measures include the use of a metallic material having heat conduction, for instance aluminum alloys, stainless steel or brass, in a holder and peripheral members of the circuit unit. Other concrete measures that are taken include lowering of the temperature of the circuit unit by shaping the constituent parts that surround the circuit unit so as to secure as large a heat-dissipating surface area as possible.

Expensive materials must be selected in order to implement such measures, while the complex shapes involved make reductions in size difficult. All the above translates into higher component costs, which is problematic.

Tubing, harnesses and connectors must be disposed in an environment in which sufficient space cannot be secured, in internal EGR control devices in which an exhaust temperature sensor and an exhaust pressure sensor are disposed in an exhaust pipe. It is thus difficult to secure space for attachment of the exhaust temperature sensor and the exhaust pressure sensor.

When a sensor is disposed in an exhaust pipe, moreover, high-temperature heat from the exhaust pipe is transferred to the circuit unit of the sensor. Measures must therefore be taken, for instance by arranging the sensor spaced from the exhaust pipe, in order to reduce thermal impact from the exhaust pipe.

Specifically, a harness must be extended, and in some instances, moreover, a pressure guiding tube for introducing pressure of the exhaust gas into the exhaust pressure sensor must be laid, and components for fixing the sensor and/or the harness may be required. Component costs increase accordingly, which is problematic.

It is an object of the present invention, arrived at in order to solve the above problems, to provide a temperature measuring device that is less expensive and more precise than conventional devices.

The temperature measuring device according to the present invention includes: a case which has a bottomed tubular shape with a closed portion at one end and an opening at the other end, and in which a temperature sensing part that receives heat by being in direct contact with a heat source is disposed on the side of the closed portion; an infrared temperature sensor unit in which an infrared temperature detection unit that has a light-receiving surface receiving an infrared ray and detects the received infrared ray and outputs the ray in the form of an electrical signal is disposed opposite the temperature sensing part while being spaced therefrom inside the case; and a connection terminal unit which has in the interior thereof a circuit unit that acquires the electrical signal, which is the output from the infrared temperature sensor unit, via connection wiring connected to the infrared temperature sensor unit and that implements signal processing on the electrical signal to correct a temperature characteristic, in order to generate temperature information so that the temperature information is outputted to an external device, wherein the connection terminal unit having the circuit unit in the interior thereof can be disposed at a position spaced from the heat source.

By virtue of the effect of thermal impact reduction elicited by a configuration in which a circuit unit is disposed spaced from a heat source, in the present invention the periphery of a circuit unit can be configured out of inexpensive materials, with reductions in changes in the temperature characteristic of the electronic components that make up the circuit unit. As a result, a temperature measuring device can be provided that is less expensive and more precise than conventional devices.

DESCRIPTION OF THE PREFERRED EMBODIMENTS

Preferred embodiments of the temperature measuring device of the present invention will be explained next with reference to accompanying drawings.

Embodiment 1

Figure 1:
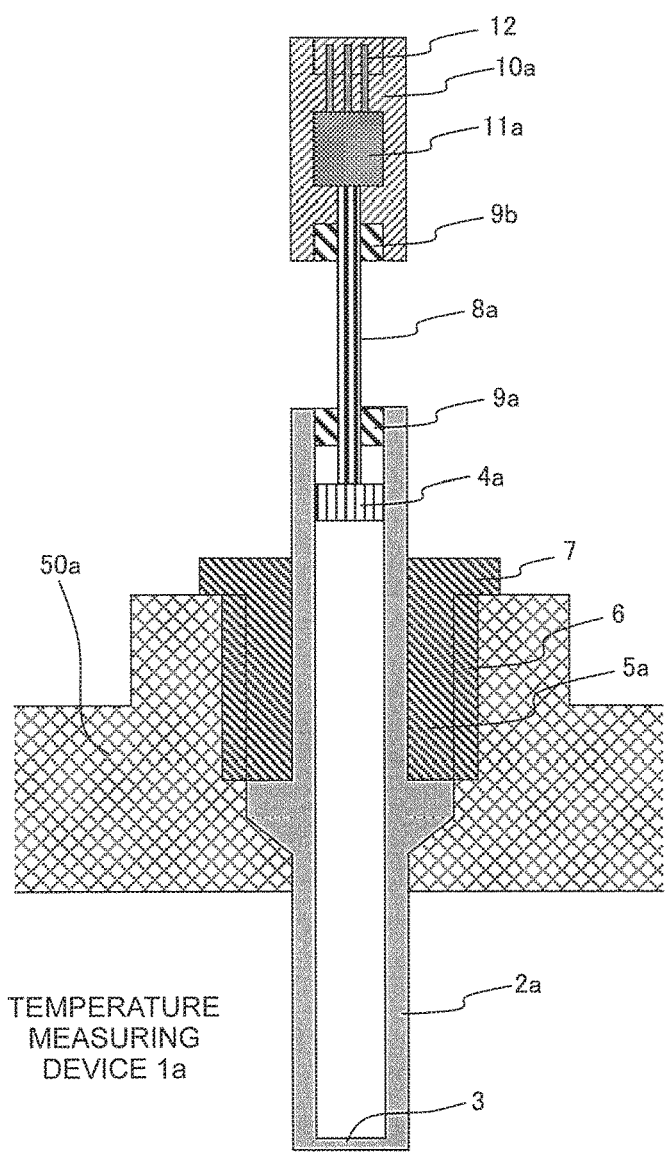
FIG. 1 is a cross-sectional diagram illustrating a temperature measuring device of Embodiment 1 of the present invention, in a state where the device is attached to an exhaust pipe.

FIG. 1 is a cross-sectional diagram illustrating a temperature measuring device of Embodiment 1 of the present invention, in a state where the device is attached to an exhaust pipe. As illustrated in FIG. 1, a temperature measuring device 1$a$ of the present Embodiment 1 absorbs infrared energy in the form of heat, and outputs temperature information on the basis of a rise in temperature derived from the absorbed heat. The temperature measuring device 1$a$ is provided with a tubular portion 2$a$ and an infrared temperature sensor unit 4$a$.

The tubular portion 2$a$ is made up of a metal having heat resistance, for instance stainless steel. The tubular portion 2$a$ is formed as a bottomed cylinder having a closed portion at one end and an opening at the other end. The tubular portion 2$a$ having such a shape is formed, for instance, by pressing of a plate material and/or cold forging of a wire material.

A temperature sensing part 3 is formed in a part of the tubular portion 2$a$, specifically on the closed portion side. The temperature sensing part 3 comes in direct contact with a heat source, and absorbs heat therefrom.

A thin wall portion being the temperature sensing part 3 of the tubular portion 2$a$ is formed integrally with the tubular portion, but may be formed separately from the tubular portion. To form the thin wall portion separately, a member formed spaced from the thin wall is joined, by welding, brazing, bonding or the like, to one end of the tubular portion. A material having better heat conduction than the tubular portion is selected as the material of the separate member, to enable thereby a better thermal response of the temperature sensing part.

Austenitic stainless steel such as SUS 310S, SUS 304 or SUS 316, having excellent heat resistance, can be used as stainless steel, being an example of the forming material of the tubular portion 2$a$. Alternatively, a material having high heat resistance, for instance a zirconia-based ceramic material of low thermal conductivity may be used instead of austenitic stainless steel. In order to improve the thermal response, the tubular portion 2$a$ should be formed to be as thin-walled as possible, so long as no problems in terms of strength are incurred in doing so.

Next, for instance a material such as an aluminum alloy, stainless steel or brass is used as a metallic material having good heat conduction in a nipple 5$a$, which is formed as a substantially tubular portion. The nipple 5$a$ has, on the outer peripheral surface thereof, a male thread portion 6, and has a hexagonal nut 7 at one end. The nipple 5$a$ is rotatably fitted to the outer periphery of the tubular portion 2$a$.

A hole for attachment of the temperature measuring device 1$a$ is formed in an exhaust pipe 50$a$. The male thread portion 6 is assembled onto a female thread portion formed in a part of the hole, as a result of which the temperature measuring device 1$a$ becomes fixed to the exhaust pipe 50$a$.

Figure 2:
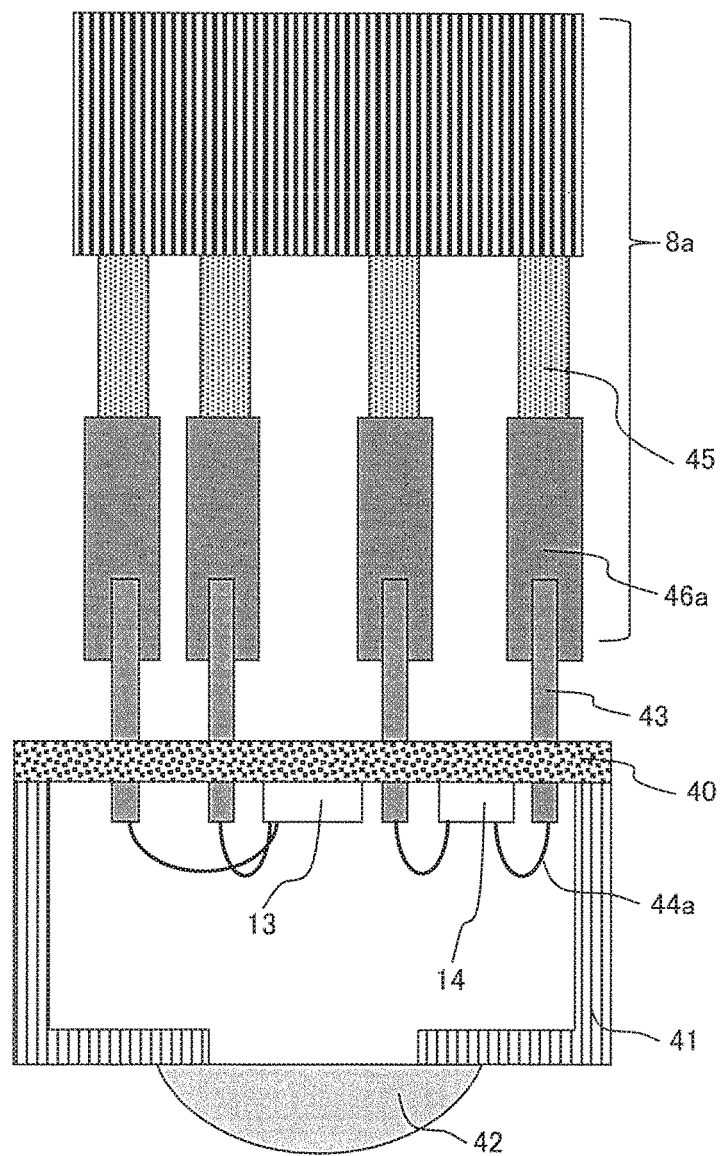
FIG. 2 is a cross-sectional diagram illustrating an infrared temperature sensor unit of the temperature measuring device of Embodiment 1 of the present invention.

FIG. 2 is a cross-sectional diagram illustrating the infrared temperature sensor unit of the temperature measuring device of Embodiment 1 of the present invention. As illustrated in FIG. 2, the infrared temperature sensor unit 4$a$ is made up of a thermopile element 13 as a sensing element that detects an infrared ray, a heat-sensitive resistive element 14 as a sensing element for temperature compensation, a substrate 40 on which the sensing elements 13, 14 are fixed, for connection to the exterior, and a cap 41 in which a lens is assembled onto a light guide of the thermopile element 13.

The infrared temperature sensor unit 4a, configured such that the sensing elements 13, 14 are accommodated therein, is disposed at the opening side of the tubular portion 2a, and is fixed to the tubular portion 2a so that the infrared temperature sensor unit 4a opposes the temperature sensing part 3 while being spaced from the temperature sensing part 3.

The thermopile element 13 is made up of a thermocouple formed on a board that is mounted on the substrate 40. The thermopile element 13 outputs, as output voltage, an electromotive force that is generated through reception of an infrared ray.

The heat-sensitive resistive element 14 is mounted on the substrate 40. The resistance value of the heat-sensitive resistive element 14 varies with changes in temperature, so that the ambient temperature of the thermopile element 13 is detected on the basis of the resistance value of the heat-sensitive resistive element 14.

The cap 41 is a substantially tubular shape made of metal, and has an opening that is opened, in the form of a circle, in the light guide of the thermopile element 13. A lens 42 is assembled into the opening of the cap 41.

The thermopile element 13 and the heat-sensitive resistive element 14 are disposed on the lower face of the substrate 40. Four lead terminals 43 are attached to the substrate 40, penetrating the substrate 40 vertically. The lead terminals 43 and the electrodes of the thermopile element 13 and of the heat-sensitive resistive element 14 are connected by way of bonding wires 44a. Driving power is supplied to the thermopile element 13 and to the heat-sensitive resistive element 14, and detection signals are transmitted, through the lead terminals 43.

Other than the thermopile element 13, a sensing element that outputs a signal upon detection of temperature on the basis of an infrared ray, for instance a bolometer or an infrared diode, can be used as the sensing element that detects an infrared ray.

Materials the resistance value of which varies with temperature, for instance platinum, permalloys and thermistors are well known as sensing elements for temperature compensation in the case of the heat-sensitive resistive element 14. However, a thermocouple, diode or the like other than the heat-sensitive resistive element 14 may also be used as the sensing element for temperature compensation.

Next, the connection wiring 8a is configured by having four lead wires 45, and is protected by being covered by a metal pipe or protective tube. The ends of the four lead wires 45 are fixed by crimping with one end of each of respective crimp terminals 46a. The other ends of the crimp terminals 46a are connected, by a joining means such as welding, to the four lead terminals 43 disposed on the top face of the substrate.

A sealing member 9a for insulatively holding the infrared temperature sensor unit 4a is attached, from the opening side of the opening of the tubular portion 2, and is fixed to the tubular portion 2 while covering the connection wiring 8a.

One end of the connection wiring 8a is connected to the infrared temperature sensor unit 4a, and the other end is connected to a connection terminal unit 10a.

Figure 3:
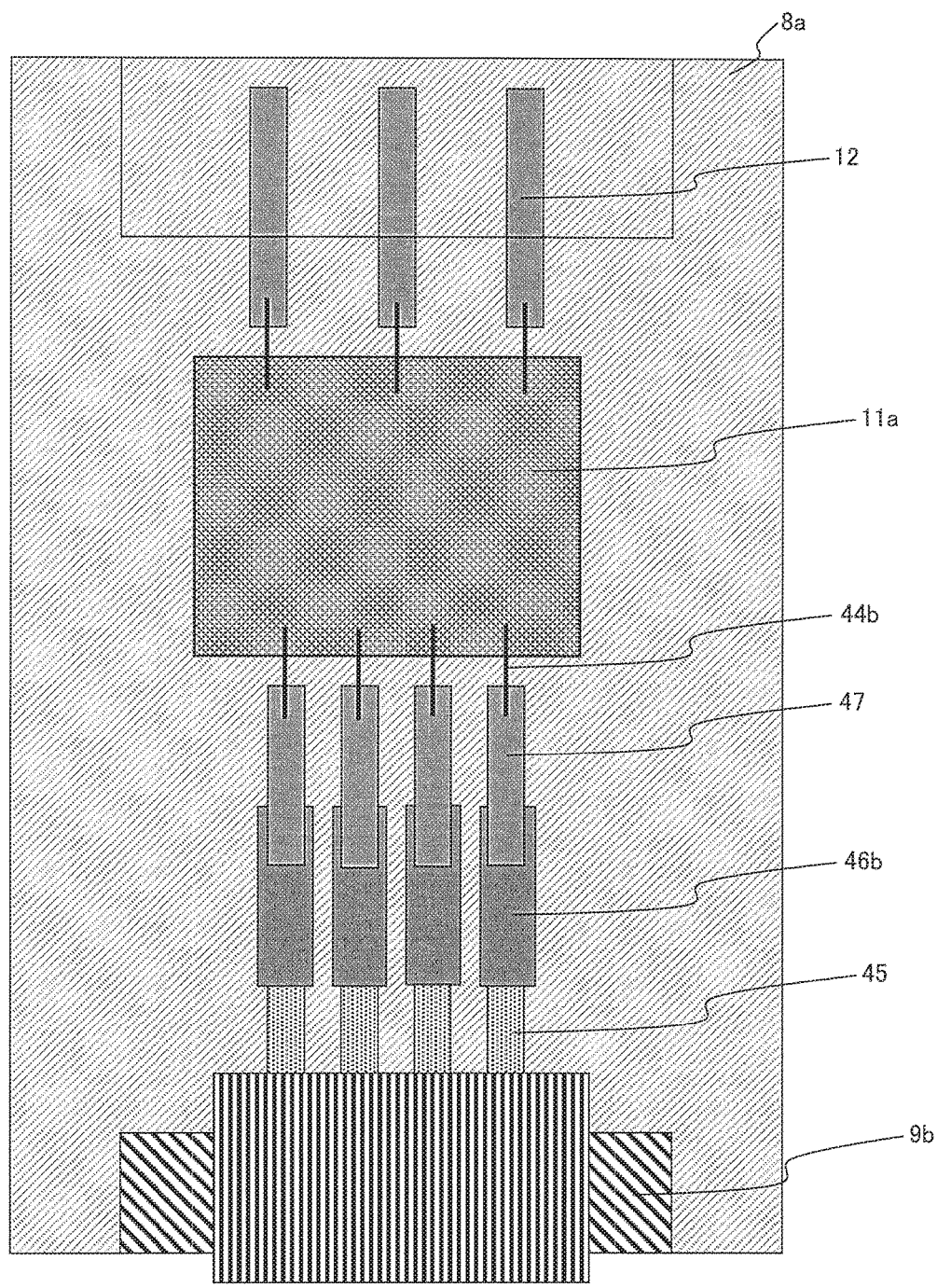
FIG. 3 is a cross-sectional diagram illustrating a connection terminal unit of the temperature measuring device of Embodiment 1 of the present invention.

FIG. 3 is a cross-sectional diagram illustrating the connection terminal unit 10a of the temperature measuring device of Embodiment 1 of the present invention. As illustrated in FIG. 3, a circuit unit 11a is disposed on the connection terminal unit 10a. First ends of the circuit unit 11a are connected to connector terminals 12 by way of for instance bonding wires 44b, and second ends are connected to first ends of circuit terminals 47.

The ends of the four lead wires 45 are fixed by crimping with first ends of respective crimp terminals 46b. The second ends of the crimp terminals 46b are connected to respective circuit terminals 47 by a joining means such as welding.

A sealing member 9b for holding insulatively the circuit unit 11a in the interior of the connection terminal unit 10a is attached to an end of the connection terminal unit 10a, the sealing member 9b being fixed to the connection terminal unit 1a while covering the connection wiring 8a.

A terminal attached to for instance a harness extending from an external circuit (for instance, an ECU), not shown, is connected to the circuit unit 11a via the connector terminals 12 of the connection terminal unit 10a. As a result, the output of the infrared temperature sensor unit 4a is transmitted to an external circuit (for instance, an ECU) via the lead wires 45, the circuit unit 11a and the connector terminals 12.

Figure 4:
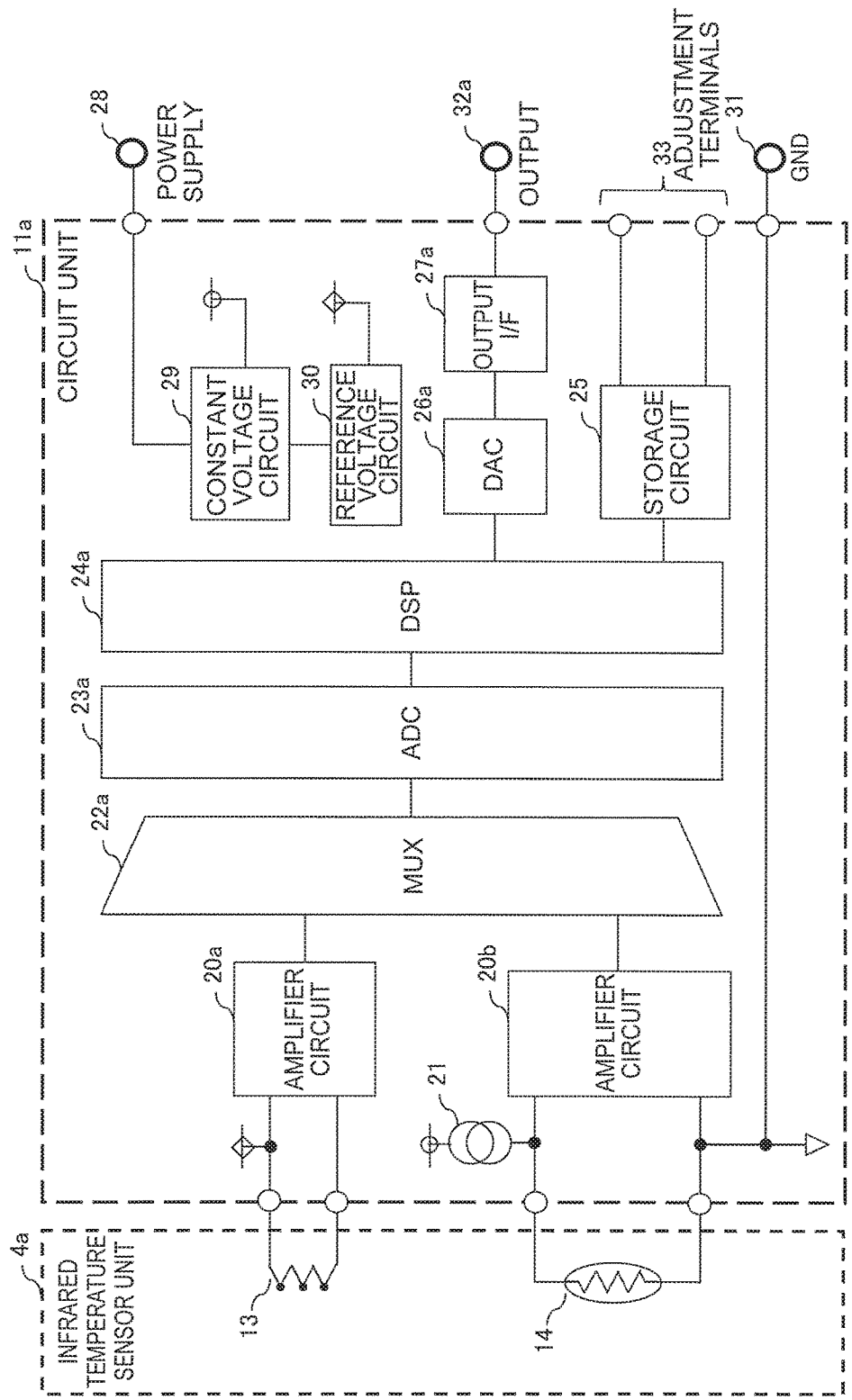
FIG. 4 is a circuit diagram of the temperature measuring device of Embodiment 1 of the present invention.

FIG. 4 is circuit diagram of the temperature measuring device of Embodiment 1 of the present invention. The operation of the circuit unit 11a will be explained in detail next with reference to the circuit diagram of the temperature measuring device of the present Embodiment 1 illustrated in FIG. 4.

A signal from the thermopile element 13 within the infrared temperature sensor unit 4a is amplified in an amplifier circuit 20a. Current is supplied, from a constant current circuit 21, to the heat-sensitive resistive element 14 within the infrared temperature sensor unit 4a. As a result, a voltage output signal at both ends of the heat-sensitive resistive element 14, corresponding to a value resulting from conversion of resistance to voltage, is amplified in an amplifier circuit 20b.

The amplified voltage outputs of the thermopile element 13 and of the heat-sensitive resistive element 14 are inputted to a multiplexing conversion circuit 22a (for instance, a multiplexer). The multiplexing conversion circuit 22a switches the inputted signals, at periods established beforehand, and outputs the signals to an analog-digital conversion circuit 23a.

The analog-digital conversion circuit 23a converts to digital signals the analog signals received from the multiplexing conversion circuit 22a, and outputs the digital signals to a digital signal processing circuit 24a. As a result, the digital signal processing circuit 24a acquires, as digital signals, a temperature information signal of the temperature sensing part 3 as detected by the thermopile element 13 and a temperature information signal of the infrared temperature sensor unit 4a as detected by the heat-sensitive resistive element 14.

On the basis of the temperature information signal of the infrared temperature sensor unit 4a, the digital signal processing circuit 24a executes a process of correcting a temperature characteristic of the temperature information signal of the temperature sensing part 3, a process of correcting signal nonlinearity to linearity, and a process of output adjustment to a desired characteristic.

The corrected value resulting from correction and the adjusted value resulting from output adjustment in the digital signal processing circuit 24a are temporarily stored in the storage circuit 25. The corrected value and adjusted value having been temporarily stored are set and modified to desired values through communication from the exterior with the storage circuit 25 via adjustment terminals 33, the resulting values being thereafter stored in the storage circuit 25. An EEPROM, a flash memory or the like is ordinarily used as the storage circuit 25, but a PROM or EPROM may also be used.

The Inter-Integrated Circuit (I2C) scheme is ordinarily resorted to as the communication scheme with the storage circuit 25, but for instance the Serial Peripheral Interface (SPI) or Microwire scheme may also be used.

The digital-analog conversion circuit 26a converts to an analog signal the digital signal resulting from signal processing in the digital signal processing circuit 24a. The signal resulting from conversion to an analog signal is transmitted to an output interface circuit 27a (for instance, a voltage follower circuit), and is voltage-outputted in the form of final temperature information. An instance has been explained in which analog voltage output is used as the output mode, but frequency output or digital output can also be resorted to.

Although not explained in detail herein, FIG. 4 illustrates a constant voltage circuit 29 for supplying constant voltage and a reference voltage circuit 30 for supplying a reference voltage, within the circuit unit 11a.

In Embodiment 1, thus, the circuit unit in the temperature measuring device can be configured, inside the connection terminal unit, spaced from the exhaust pipe the temperature whereof is high on account of exhaust gas. Accordingly, the circuit unit is not exposed to high temperature. It becomes as a result possible to utilize constituent parts made up of inexpensive materials around the circuit unit, thanks to a reduction in thermal impact. Further, the influence of the circuit unit on the temperature characteristic can be reduced, and accordingly it becomes possible to provide an inexpensive high-precision temperature measuring device.

Embodiment 2

Figure 5:
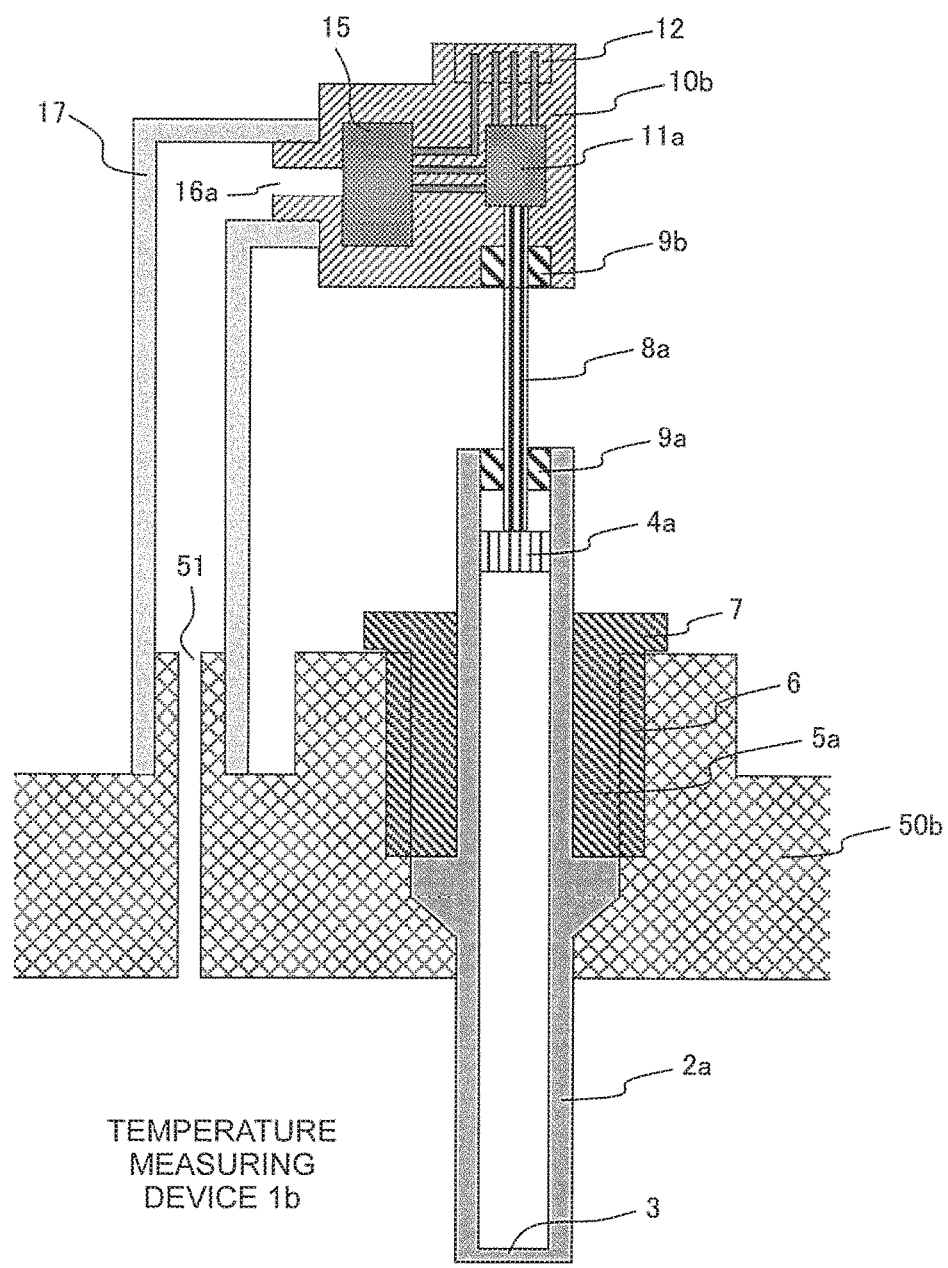
FIG. 5 is a cross-sectional diagram illustrating a temperature measuring device of Embodiment 2 of the present invention, in a state where the device is attached to an exhaust pipe.

FIG. 5 is a cross-sectional diagram illustrating a temperature measuring device of Embodiment 2 of the present invention, in a state where the device is attached to an exhaust pipe. The temperature measuring device of the present Embodiment 2 differs from that of Embodiment 1 in that now the temperature measuring device is configured integrally with a pressure measuring device. The explanation below focuses therefore on this difference.

As illustrated in FIG. 5, the temperature measuring device 1b of the present Embodiment 2 is identical to that of Embodiment 1 above, except for the configuration of a connection terminal unit 10b. The connection terminal unit 10b is configured, integrally with the pressure measuring device 15, so that a signal received from the pressure measuring device 15 is outputted through the connector terminals 12.

The exhaust pipe 50b in the present Embodiment 2 has a pressure takeout outlet 51 formed therein. A pressure inlet 16a is provided in the connection terminal unit 10b having the pressure measuring device 15 accommodated therein. The pressure measuring device 15 acquires the pressure in the exhaust pipe 50b via the tube 17 that connects the pressure takeout outlet 51 and the pressure inlet 16a.

Figure 6:
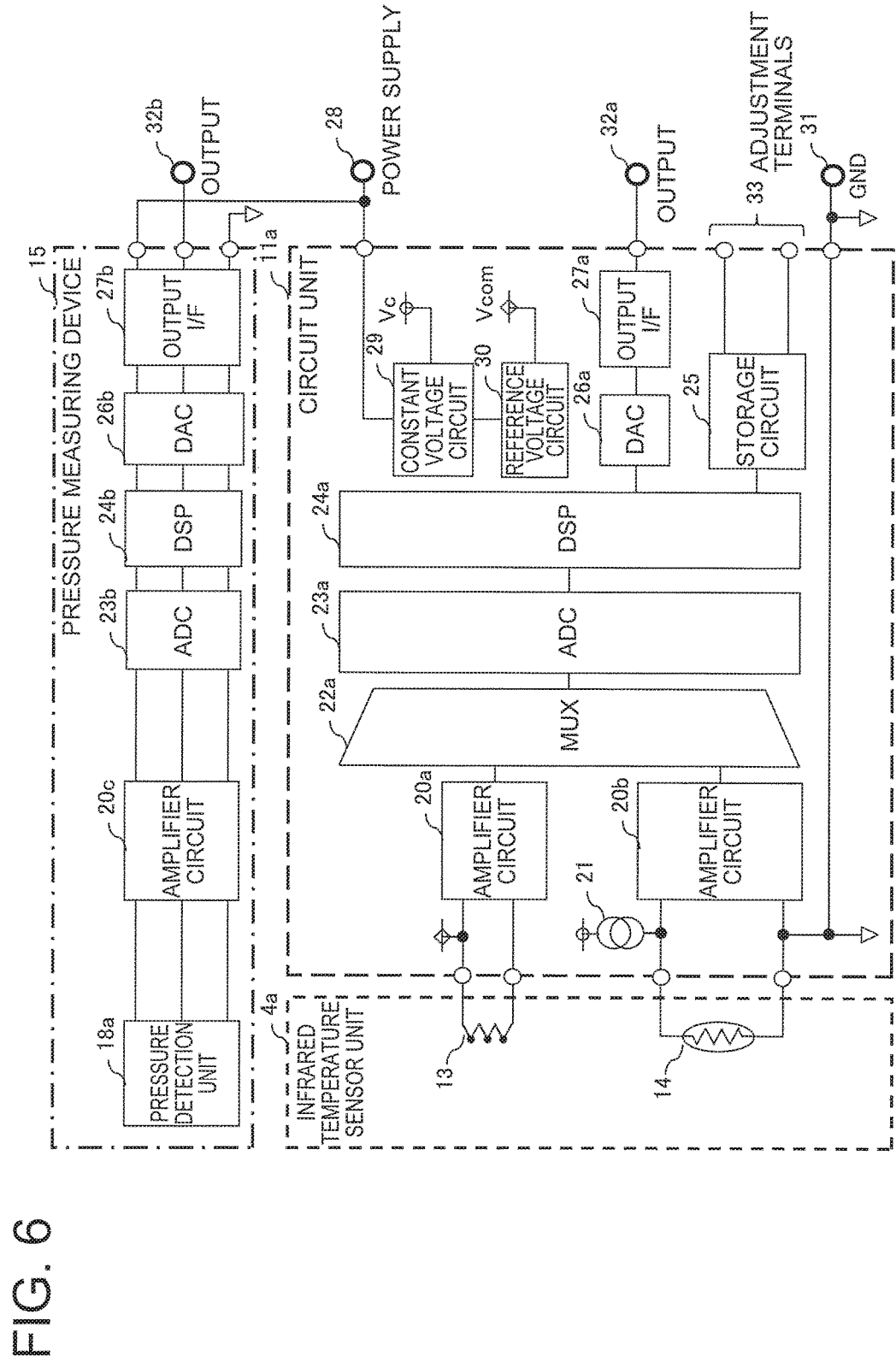
FIG. 6 is circuit diagram of the temperature measuring device of Embodiment 2 of the present invention.

FIG. 6 is a circuit diagram of the temperature measuring device of Embodiment 2 of the present invention. The operation of the circuit unit 11a and of the pressure measuring device 15 will be explained in detail next with reference to the circuit diagram of the temperature measuring device of the present Embodiment 2 illustrated in FIG. 6.

A pressure detection unit 18a inside the pressure measuring device 15 is for instance configured in the form of a strain gauge on a diaphragm formed in a silicon substrate. This strain gauge detects, as pressure information, the strain of the diaphragm derived from pressure fluctuations, and the pressure information is outputted as a voltage value. In the present Embodiment 2 there is explained a method for detecting pressure by way of a strain gauge, but the pressure detection method is not limited to a strain gauge.

The voltage output of the pressure detection unit 18a is amplified in the amplifier circuit 20c. The amplified voltage output is transmitted to an analog-digital conversion circuit 23b. Further, the pressure information signal converted from an analog signal to a digital signal by the analog-digital conversion circuit 23b is transmitted to the digital signal processing circuit 24a. The digital signal processing circuit 24b performs a process of correcting a temperature characteristic, a process of correcting signal nonlinearity to linearity, and a process of output adjustment to a desired characteristic.

The digital-analog conversion circuit 26b converts to an analog signal the digital signal resulting from signal processing in the digital signal processing circuit 24b. The signal resulting from conversion to an analog signal is transmitted to an output interface circuit 27b (for instance, a voltage follower circuit), and is voltage-outputted in the form of final temperature information. An instance has been explained in which analog voltage output is used as the output mode, but frequency output or digital output can also be resorted to.

The pressure measuring device 15 of the temperature measuring device 1b of the present Embodiment 2 is configured integrally with the connection terminal unit 10b. Adopting such a configuration allows reducing the size of a harness and of a connector pertaining to pressure measurement, and allows realizing an inexpensive temperature measuring device 1b integrated with the pressure measuring device 15.

In the configuration of Embodiment 2, thus, the pressure measuring device is disposed within the connection terminal unit of the temperature measuring device, with the circuit unit of the pressure measuring device being integrated into the circuit unit of the temperature measuring device. As a result it becomes possible to provide an inexpensive temperature measuring device, integrated with a pressure measuring device, with a reduced number of circuit units, as well as reduced connectors and harnesses.

Embodiment 3

In Embodiment 2, a configuration has been explained in which the pressure measuring device and the connection terminal unit 10b are integrated together. In the present Embodiment 3, by contrast, a configuration will be explained in which the pressure detection unit in the pressure measuring device is removed, and a processing circuit of pressure signals is built into the circuit unit.

Figure 7:
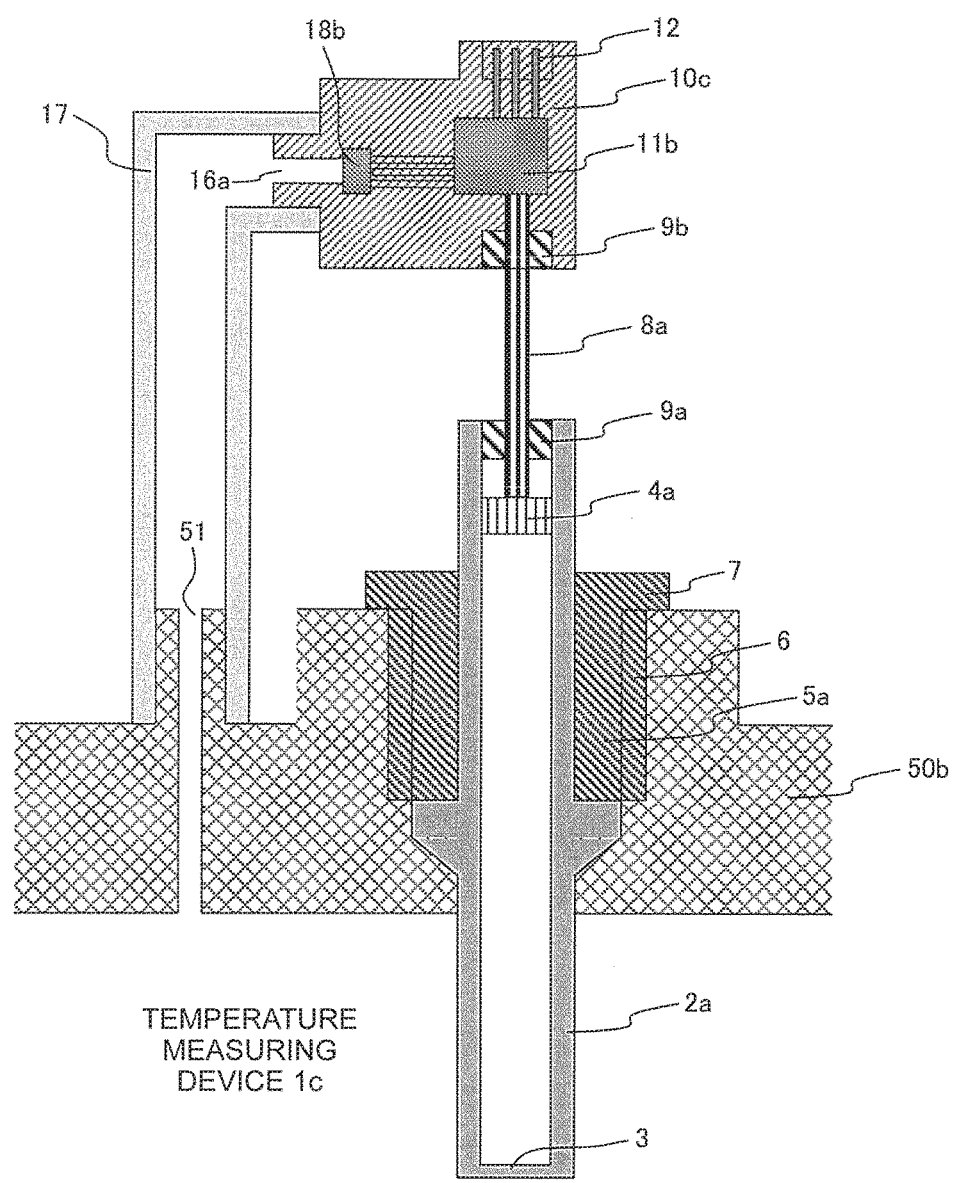
FIG. 7 is a cross-sectional diagram illustrating a temperature measuring device of Embodiment 3 of the present invention, in a state where the device is attached to an exhaust pipe.

FIG. 7 is a cross-sectional diagram illustrating a temperature measuring device of Embodiment 3 of the present invention, in a state where the device is attached to an exhaust pipe. The temperature measuring device of the present Embodiment 3 differs from that of Embodiment 2 above in that now the temperature measuring device is configured integrally with the pressure detection unit, instead of being configured integrally with the pressure measuring device. The explanation below focuses therefore on this difference.

As illustrated in FIG. 7, a temperature measuring device 1c of the present Embodiment 3 is identical to that of Embodiments 1 and 2, except for the configuration of a connection terminal unit 10c. The connection terminal unit 10c is configured having a pressure detection unit 18b integrated therewith. Signals from the pressure detection unit 18b are outputted from the connector terminals 12 via a circuit unit 11b.

The exhaust pipe 50b in the present Embodiment 3 has the pressure takeout outlet 51 formed therein, as is the case in Embodiment 2 above. As in Embodiment 2 above, the pressure inlet 16a is provided in the connection terminal unit 10c having the pressure detection unit 18b accommodated therein. The pressure detection unit 18b acquires the pressure in the exhaust pipe 50b via the tube 17 that connects the pressure takeout outlet 51 and the pressure inlet 16a.

Figure 8:
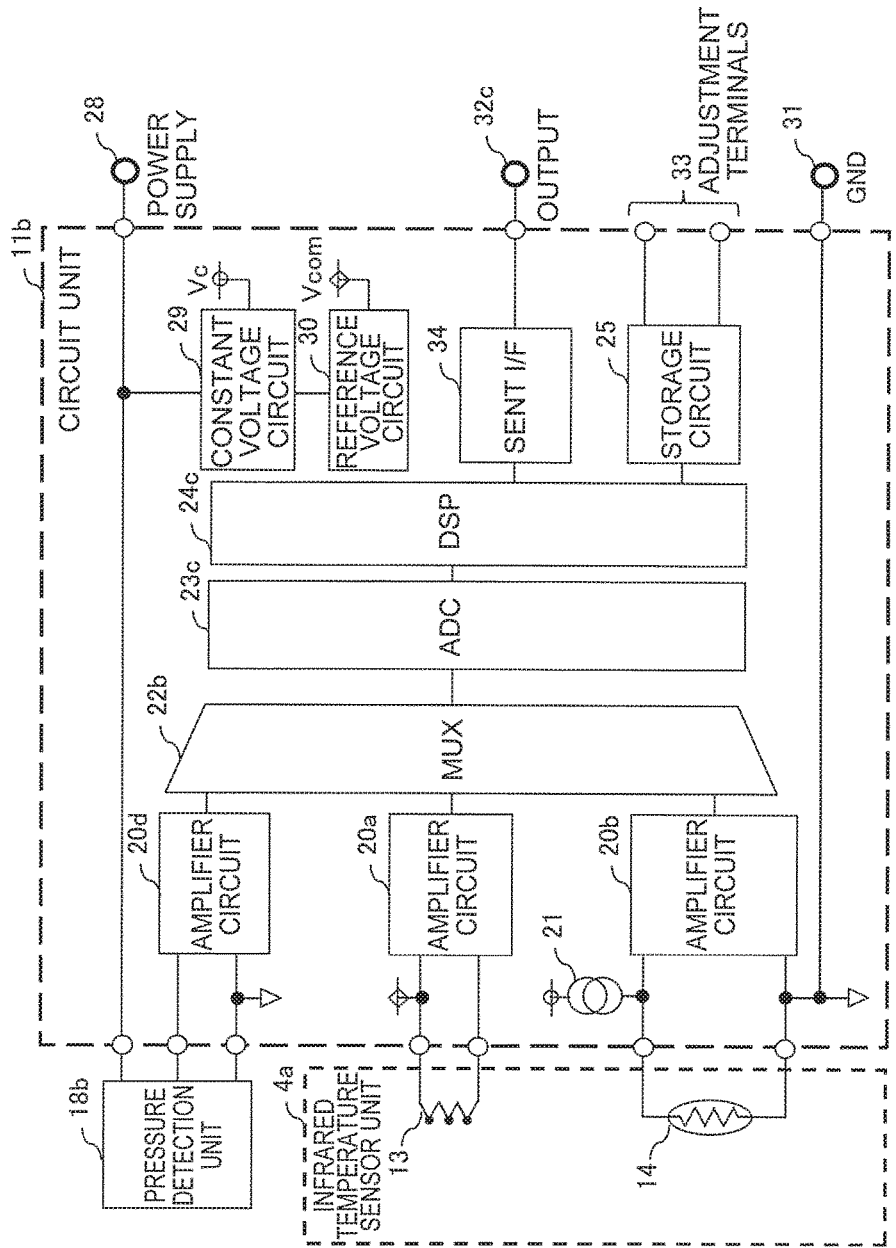
FIG. 8 is circuit diagram of the temperature measuring device of Embodiment 3 of the present invention.

FIG. 8 is a circuit diagram of the temperature measuring device of Embodiment 3 of the present invention. The operation of the circuit unit 11b and of the pressure detection unit 18b will be explained in detail next with reference to the circuit diagram of the temperature measuring device of the present Embodiment 3 illustrated in FIG. 8.

The pressure detection unit 18b is for instance configured in the form of a strain gauge on a diaphragm formed in a silicon substrate. This strain gauge detects, as pressure information, the strain of the diaphragm derived from pressure fluctuations, and the pressure information is outputted as a voltage value. In the present Embodiment 3, there is explained a method for detecting pressure by way of a strain gauge, but the pressure detection method is not limited to a strain gauge.

In the circuit unit 11b of the present Embodiment 3, an amplifier circuit 20d is further provided in the circuit unit 11a explained in Embodiments 1 and 2 above, and a SENT interface circuit 34 is provided instead of the digital-analog conversion circuit 26a and the output interface circuit 27a.

A signal from the thermopile element 13 within the infrared temperature sensor unit 4a is amplified in the amplifier circuit 20a. Current is supplied from the constant current circuit 21 to the heat-sensitive resistive element 14 within the infrared temperature sensor unit 4a. As a result, a voltage output signal at both ends of the heat-sensitive resistive element 14, corresponding to the value resulting from conversion of resistance to voltage, is amplified in the amplifier circuit 20b. The voltage output signal from the pressure detection unit 18b is amplified in the amplifier circuit 20d.

The amplified voltage outputs of the thermopile element 13, the heat-sensitive resistive element 14 and the pressure detection unit 18b are inputted to a multiplexing conversion circuit 22b (for instance, a multiplexer). The multiplexing conversion circuit 22b switches the inputted signal, at periods established beforehand, and outputs the resulting signal to an analog-digital conversion circuit 23c.

The analog-digital conversion circuit 23c converts to a digital signal the analog signal received from the multiplexing conversion circuit 22b, and outputs the resulting digital signal to a digital signal processing circuit 24c. As a result, the digital signal processing circuit 24c acquires, as digital signals, a temperature information signal of the temperature sensing part 3 as detected by the thermopile element 13, a temperature information signal of the infrared temperature sensor unit 4a as detected by the heat-sensitive resistive element 14 and a pressure information signal detected by the pressure detection unit 18b.

On the basis of the temperature information signal of the infrared temperature sensor unit 4a, the digital signal processing circuit 24c executes a process of correcting a temperature characteristic of the temperature information signal of the temperature sensing part 3, a process of correcting signal nonlinearity to linearity, a process of output adjustment to a desired characteristic, a process of correcting a temperature characteristic in the pressure information signal of the pressure detection unit 18b, a process of correcting to signal nonlinearity to linearity, and a process of output adjustment to a desired characteristic.

The corrected value resulting from correction and the adjusted value resulting from output adjustment in the digital signal processing circuit 24c are temporarily stored in the storage circuit 25. The corrected value and adjusted value having been temporarily stored are set and modified to desired values through communication from the exterior with the storage circuit 25 via the adjustment terminals 33, the resulting values being thereafter stored in the storage circuit 25. An EEPROM, a flash memory or the like is ordinarily used as the storage circuit 25, but a PROM or EPROM may also be used.

The Inter-Integrated Circuit (I2C) scheme is ordinarily resorted to as the communication scheme with the storage circuit 25, but for instance the Serial Peripheral Interface (SPI) or Microwire scheme may also be used.

The SENT interface circuit 34 superimposes a temperature signal of the temperature measuring device and a pressure signal of the pressure measuring device onto the digital signal resulting from signal processing in the digital signal processing circuit 24c. Further, the SENT interface circuit 34 transmits the signal, after superposition, in such a way so as to form a pulse signal on the basis of a SENT scheme according to Standard SAE-J2716 of the Society of Automotive Engineers. The acronym "SENT" stands for Single Edge Nibble Transmission.

Figure 9:
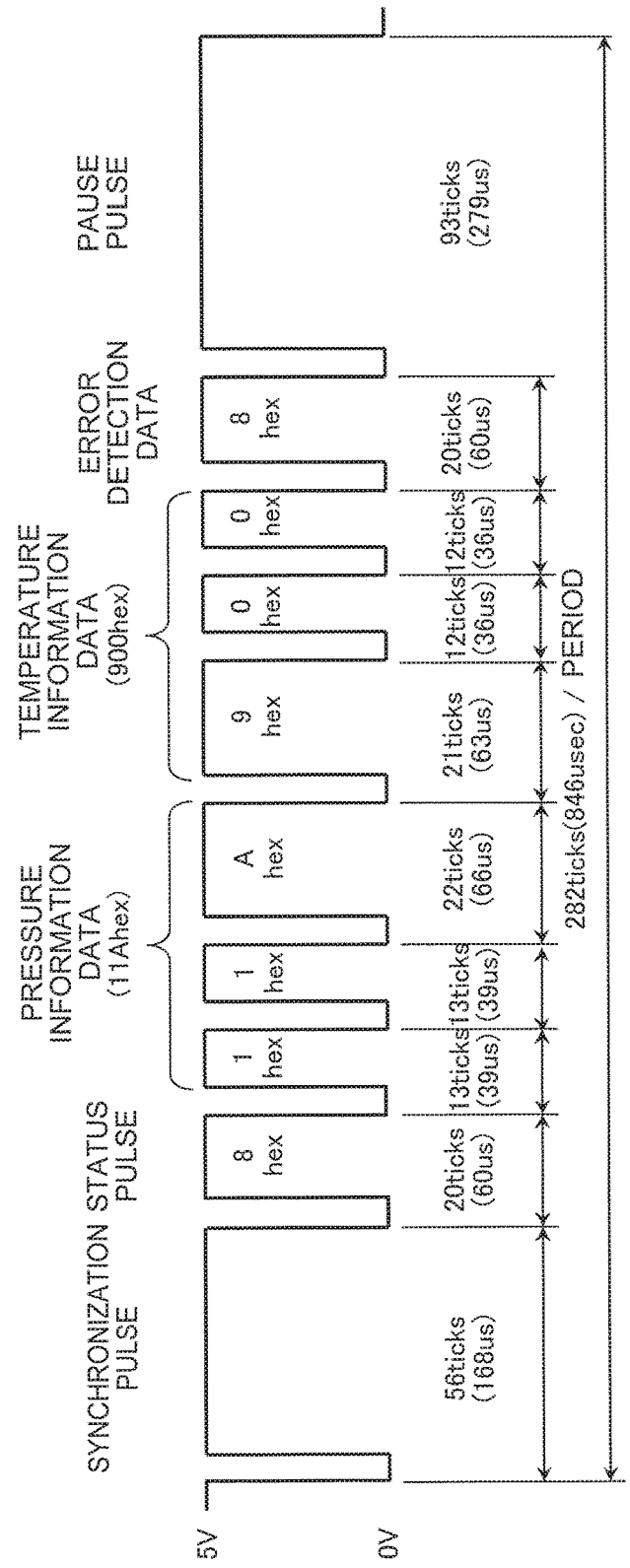
FIG. 9 is a diagram illustrating an SENT output waveform of the temperature measuring device according to Embodiment 3 of the present invention.

FIG. 9 is a diagram illustrating a SENT output waveform of a temperature measuring device according to Embodiment 3 of the present invention. The signal outputted by the SENT interface circuit 34 is a pulse signal of repeated 0 V and 5 V, as illustrated in FIG. 9. In order from the beginning, the signal is made up of: a synchronization pulse denoting synchronization data, a status pulse denoting status data, three communication data pulses denoting pressure information data, three communication data pulses denoting temperature information data, an error detection pulse denoting error detection data, and a pause pulse for fitting one period to a predetermined time.

In FIG. 9, the units of the time axis are "ticks". In the present Embodiment 1, there is set for instance:

1 (tick)=3 (μs).

As illustrated in FIG. 9, one interval of the pulse signal extends from the point in time at which a predetermined threshold value is crossed upon a voltage fall, until the from the point in time at which the threshold value is crossed again upon a new voltage fall, following an intervening voltage rise. The pulse signal illustrated in FIG. 9 is set so that the pulse period is lengthened by a predetermined time whenever a numerical value, denoted by a bit string of corresponding data, increases by one.

In the present Embodiment 3 described above, a SENT scheme widely used in on-board LAN communication schemes has been explained as the communication scheme between the sensor devices and the ECU, but the present invention is not limited to such a communication scheme. For instance, serial transmission may be resorted to on the basis of communication schemes such as Local Interconnect Network (LIN), Inter-Integrated Circuit (I2C), Controller Area Network (CAN) and Peripheral Sensor Interface 5 (PSI5).

In the temperature measuring device 1c of the present Embodiment 3, thus, the pressure detection unit 18b is configured integrally with the connection terminal unit 10c, and thus a circuit unit pertaining to pressure measurement can be integrated into the circuit unit 11*b*. By including such a configuration it becomes possible to realize an inexpensive temperature measuring device 1*c* integrated with a pressure detection unit and in which there can be reduced the number of circuit units pertaining to pressure measurement, while reducing connectors and harnesses.

Further, it becomes possible to reduce connector terminals and harnesses even if serial output is adopted as the output mode. An inexpensive high-precision temperature measuring device 1*c* boasting high communication reliability can be provided as a result.

In the configuration of Embodiment 3, thus, the pressure detection unit is disposed in the connection terminal unit of the temperature measuring device, and exhaust pressure is measured directly by a circuit unit. A temperature measuring device can be provided as a result that is integrated with high-precision pressure measurement boasting excellent responsiveness towards pressure fluctuations.

Embodiment 4

In Embodiment 1, an instance has been explained in which a pressure detection unit is configured integrally with a circuit unit. In the present Embodiment 4, an instance will be explained in which a pressure detection unit is provided in the vicinity of an infrared temperature sensor unit.

Figure 10:
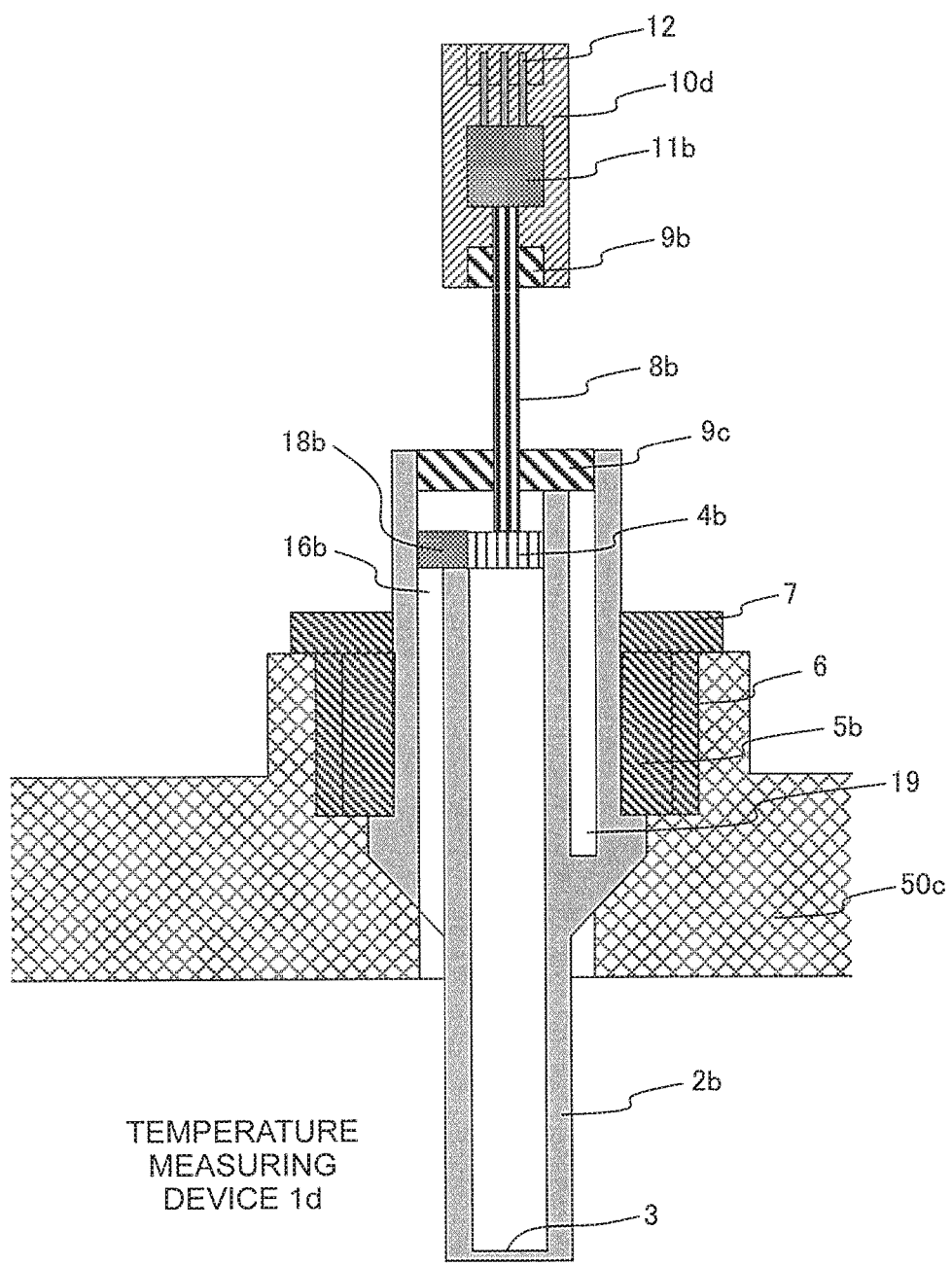
FIG. 10 is a cross-sectional diagram illustrating a temperature measuring device of Embodiment 4 of the present invention, in a state where the device is attached to an exhaust pipe.

FIG. 10 is a cross-sectional diagram illustrating a temperature measuring device of Embodiment 4 of the present invention, in a state where the device is attached to an exhaust pipe. The temperature measuring device of the present Embodiment 4 differs from that of Embodiment 3 in that now the temperature measuring device is configured integrally with a pressure detection unit by arranging a pressure detection unit adjacent to the infrared temperature sensor unit 4*b*. The explanation below focuses therefore on this difference.

As illustrated in FIG. 10, a temperature measuring device 1*d* of the present Embodiment 4 differs from Embodiment 1 in that the pressure detection unit 18*b* is disposed in the infrared temperature sensor unit 4*b*, and in that a pressure inlet 16*b* and a hollow portion 19 are provided in a tubular portion 2*b*. Signals from the pressure detection unit 18*b* are outputted through the connector terminals 12 via a connection wiring 8*b* and the circuit unit 11*b*.

Figure 11:
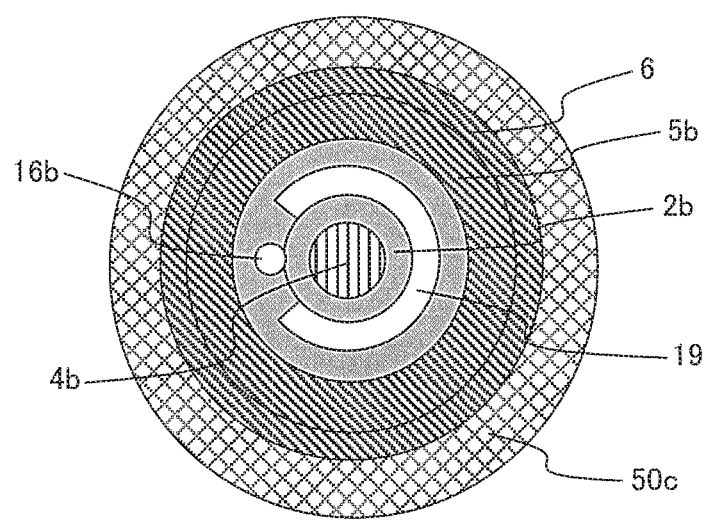
FIG. 11 is a cross-sectional diagram, in the radial direction, illustrating a state in which the temperature measuring device of Embodiment 4 of the present invention is attached to an exhaust pipe.

FIG. 11 is a cross-sectional diagram, in the radial direction, illustrating a state in which the temperature measuring device of Embodiment 4 of the present invention is attached to an exhaust pipe. As illustrated in FIG. 11, the pressure inlet 16*b* is provided by formation of a passage having a diameter of about 1 mm at the tubular portion 2*b*. The pressure inlet 16*b* is opened in an exhaust pipe 50*c* within a hole of the exhaust pipe 50*c*, as illustrated in FIG. 10. The pressure detection unit 18*b* detects the pressure of exhaust gas that passes through the pressure inlet 16*b*.

As illustrated in FIG. 11, the hollow portion 19 is provided, in the tubular portion 2*b*, on the outer peripheral side of the infrared temperature sensor unit 4*b*. By providing such a hollow portion 19, it becomes possible to reduce the thermal impact transferred from the exhaust pipe 50*c* to the infrared temperature sensor unit 4*b* and the pressure detection unit 18*b* via the tubular portion 2*b*.

Figure 12:
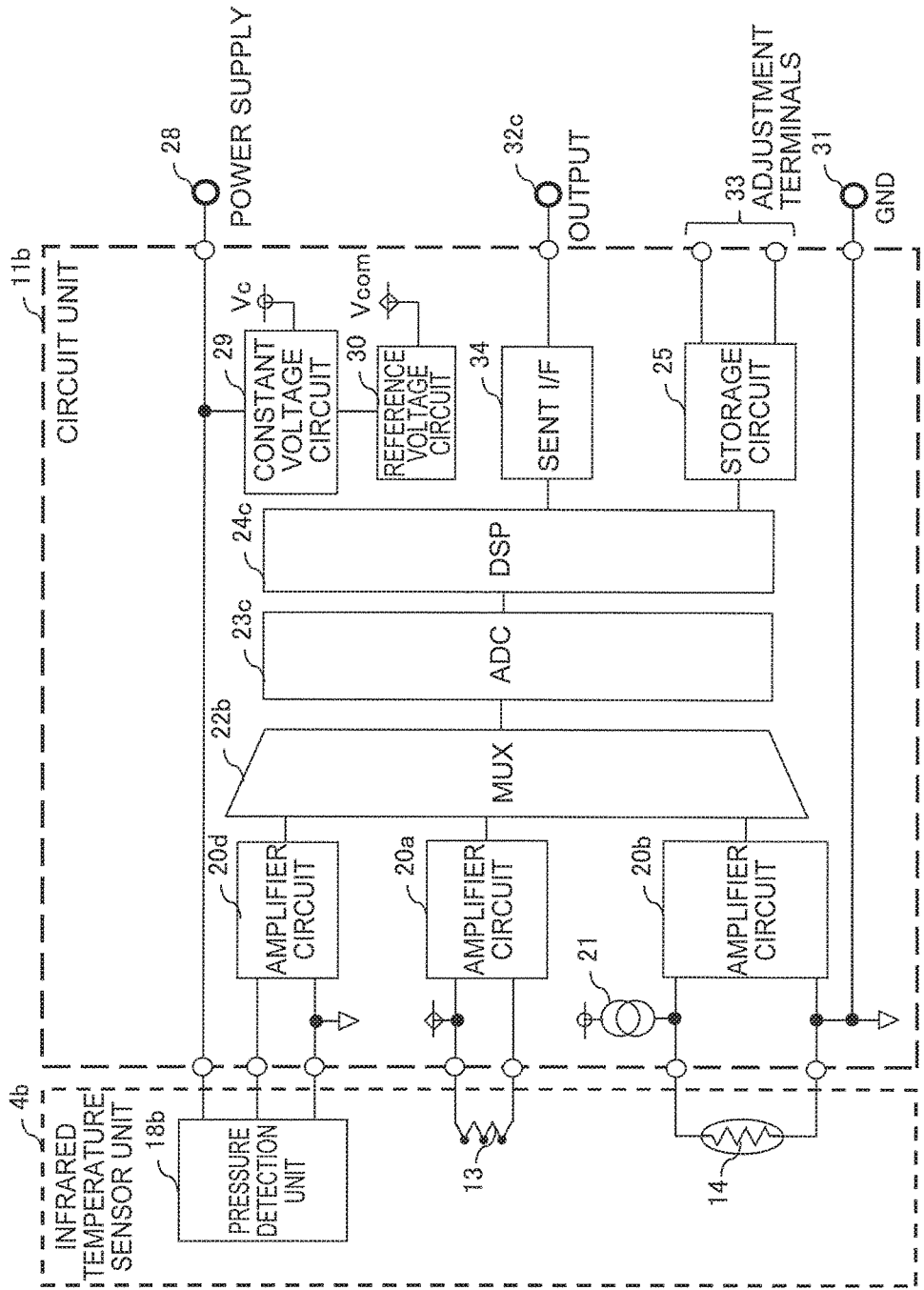
FIG. 12 is circuit diagram of the temperature measuring device of Embodiment 4 of the present invention.

FIG. 12 is a circuit diagram of a temperature measuring device of Embodiment 4 of the present invention. A detailed explanation follows next focusing on the operation pertaining to the pressure detection unit 18 disposed on the infrared temperature sensor unit 4*b*, with reference to the circuit diagram of the temperature measuring device of the present Embodiment 4 illustrated in FIG. 12. The circuit unit 11*b* in FIG. 12 is identical to the circuit unit 11*b* in FIG. 8 explained in Embodiment 3.

A signal from the thermopile element 13 within the infrared temperature sensor unit 4*b* is amplified in the amplifier circuit 20*a*. Current is supplied from the constant current circuit 21 to the heat-sensitive resistive element 14 within the infrared temperature sensor unit 4*a*. As a result, a voltage output signal at both ends of the heat-sensitive resistive element 14, corresponding to the value resulting from conversion of resistance to voltage, is amplified in the amplifier circuit 20*b*. The voltage output signal from the pressure detection unit 18*b* provided in the infrared temperature sensor unit 4*a* is amplified in the amplifier circuit 20*d*.

The amplified voltage outputs of the thermopile element 13, the heat-sensitive resistive element 14 and the pressure detection unit 18*b* are inputted to the multiplexing conversion circuit 22*b* (for instance, a multiplexer). The multiplexing conversion circuit 22*b* switches the inputted signal, at periods established beforehand, and outputs the resulting signal to the analog-digital conversion circuit 23*c*.

The analog-digital conversion circuit 23*c* converts to a digital signal the analog signal received from the multiplexing conversion circuit 22*b*, and outputs the resulting digital signal to the digital signal processing circuit 24*c*. As a result, the digital signal processing circuit 24*c* acquires, as digital signals, a temperature information signal of the temperature sensing part 3 as detected by the thermopile element 13, a temperature information signal of the infrared temperature sensor unit 4*b* as detected by the heat-sensitive resistive element 14 and a pressure information signal detected by the pressure detection unit 18*b*.

On the basis of the temperature information signal of the infrared temperature sensor unit 4*b*, the digital signal processing circuit 24*c* executes a process of correcting a temperature characteristic of the temperature information signal of the temperature sensing part 3, a process of correcting signal nonlinearity to linearity, a process of output adjustment to a desired characteristic, a process of correcting a temperature characteristic of the pressure information signal of the pressure detection unit 18*b* on the basis of the temperature information signal of the infrared temperature sensor unit 4*b*, a process of correcting to signal nonlinearity to linearity, and a process of adjusting the output to a desired characteristic.

The corrected value resulting from correction and the adjusted value resulting from output adjustment in the digital signal processing circuit 24*c* are temporarily stored in the storage circuit 25. The corrected value and adjusted value having been temporarily stored are set and modified to desired values through communication from the exterior with the storage circuit 25 via the adjustment terminals 33, the resulting values being thereafter stored in the storage circuit 25.

The SENT interface circuit 34 superimposes a temperature signal of the temperature measuring device and a pressure signal of the pressure measuring device onto the digital signal resulting from signal processing in the digital signal processing circuit 24*c*. Further, the SENT interface circuit 34 transmits the signal, after superposition, in such a way so as to form a pulse signal by a SENT scheme.

The temperature measuring device 1*d* in the present Embodiment 4 is configured in such a manner that the pressure detection unit 18*b* is built into the infrared temperature sensor unit 4*b*. Specifically, pressure is introduced into the pressure detection unit 18*b* via the pressure inlet 16*b* provided in the tubular portion 2*b*.

Adopting such a configuration allows measuring directly the pressure of exhaust from the exhaust from the exhaust pipe 50*b*, without any intervening tube passing through an interposed tube. As a result a temperature measuring device 1*d* can be provided integrated with high-precision pressure measurement and in which responsiveness towards pressure fluctuations can be improved.

In the configuration of Embodiment 4, thus, the pressure detection unit is disposed inside the infrared temperature sensor unit, so as to measure directly the pressure of exhaust from the exhaust pipe. As a result a temperature measuring device can be provided integrated with high-precision pressure measurement boasting improved responsiveness towards pressure fluctuations.

What is claimed is:

1. A temperature measuring device, comprising:
   a case which has a bottomed tubular shape with a closed portion at a first end and an opening at a second end opposite to the first end, and in which a temperature sensing part that receives heat by being in direct contact with a heat source is disposed proximate to the closed portion;
   an infrared temperature sensor unit disposed opposite the temperature sensing part while being spaced therefrom inside the case, the infrared temperature sensor unit comprising an infrared temperature detection unit that has a light-receiving surface receiving an infrared ray, detects the received infrared ray, and outputs the received infrared ray as an electrical signal; and
   a connection terminal unit comprising a circuit unit that is disposed in an interior of the connection terminal unit, acquires the electrical signal output from the infrared temperature sensor unit, via connection wiring connected to the infrared temperature sensor unit, and performs signal processing on the electrical signal to correct a temperature characteristic, in order to generate temperature information so that the temperature information is output to an external device,
   wherein the connection terminal unit having the circuit unit in the interior thereof is a unit separate from the case and is disposed at a position spaced from the case and the heat source.

2. The temperature measuring device of claim 1, further comprising:
   a pressure measuring device which is connected to the heat source via a pressure tubing, measures a pressure of the heat source, and generates pressure information based on the measured pressure,
   wherein the connection terminal unit is configured as an integral structure having the circuit unit and the pressure measuring device in the interior thereof, and the connection terminal unit outputs the temperature information and the pressure information to the external device.

3. The temperature measuring device of claim 1, further comprising:
   a pressure measuring device which is connected to the heat source via a pressure tubing, measures a pressure of the heat source, and generates pressure information based on the measured pressure,
   wherein the connection terminal unit outputs the pressure information to the external device.

4. The temperature measuring device of claim 1, further comprising:
   a pressure detection unit which is connected to the heat source via a pressure tubing and measures a pressure of the heat source,
   wherein the connection terminal unit is configured as an integral structure having the circuit unit and the pressure detection unit in the interior thereof,
   the circuit unit has a circuit that generates pressure information based on the pressure measured by the pressure detection unit and a circuit that generates the temperature information, and
   the temperature information and the pressure information generated in the circuit unit are output to the external device.

5. The temperature measuring device of claim 4, wherein the circuit unit has an interface circuit that outputs, through serial transmission, the temperature information and the pressure information.

6. The temperature measuring device of claim 1, further comprising:
   a pressure detection unit which is connected to the heat source via a pressure tubing, measures a pressure of the heat source, and outputs a pressure signal,
   wherein the infrared temperature sensor unit and the pressure detection unit are configured as an integral structure,
   the connection terminal unit acquires the pressure signal together with the electrical signal via the connection wiring connected to the infrared temperature sensor unit,
   the circuit unit generates pressure information by performing signal processing on the pressure signal, and
   the temperature information and the pressure information generated in the circuit unit are output to the external device.

7. The temperature measuring device of claim 6, wherein the circuit unit has an interface circuit that outputs, through serial transmission, the temperature information and the pressure information.

* * * * *